US011865820B2

(12) United States Patent
Brown et al.

(10) Patent No.: US 11,865,820 B2
(45) Date of Patent: Jan. 9, 2024

(54) REINFORCING LAYER, A CEMENTITIOUS BOARD, AND METHOD OF FORMING THE CEMENTITIOUS BOARD

(71) Applicant: SAINT-GOBAIN ADFORS CANADA, LTD., Grand Island, NY (US)

(72) Inventors: Nancy E. Brown, New Braintree, MA (US); Matthew S. Goldhawk, Amherst, NY (US); Zhenpeng Li, Pitney Flats, TN (US); Olivier Rosseler, Arlington, MA (US)

(73) Assignee: SAINT-GOBAIN ADFORS CANADA, LTD., Grand Island, NY (US)

( * ) Notice: Subject to any disclaimer, the term of this patent is extended or adjusted under 35 U.S.C. 154(b) by 163 days.

(21) Appl. No.: 16/223,721

(22) Filed: Dec. 18, 2018

(65) Prior Publication Data

US 2019/0193381 A1 Jun. 27, 2019

Related U.S. Application Data

(60) Provisional application No. 62/607,794, filed on Dec. 19, 2017.

(51) Int. Cl.
*B32B 27/12* (2006.01)
*B32B 37/15* (2006.01)
*B32B 13/14* (2006.01)

(52) U.S. Cl.
CPC .............. *B32B 27/12* (2013.01); *B32B 13/14* (2013.01); *B32B 37/15* (2013.01); *B32B 2307/7246* (2013.01)

(58) Field of Classification Search
CPC ...................................................... B32B 27/12
See application file for complete search history.

(56) References Cited

U.S. PATENT DOCUMENTS

| 2,806,811 | A | 9/1957 | von Hazmburg |
| 3,284,980 | A | 11/1966 | Dinkel |
| 3,967,016 | A | 6/1976 | Schneller et al. |
| 3,993,822 | A | 11/1976 | Knauf et al. |
| 4,040,213 | A | 8/1977 | Capaul |

(Continued)

FOREIGN PATENT DOCUMENTS

| AU | 2002211394 B2 | 2/2007 |
| CA | 2070489 A1 | 12/1993 |

(Continued)

OTHER PUBLICATIONS

Archi Expo fiberglass-reinforced waterproofing membrane, 9 pages, http:/ww.archiexpo.com/architecture-design-manufacturer/fiberglass-reinforced-waterproofing-membrane-10302.html.

(Continued)

*Primary Examiner* — Andrew T Piziali
(74) *Attorney, Agent, or Firm* — Abel Schillinger, LLP; Adrian Lawrence

(57) ABSTRACT

A reinforcing layer for a cementitious board includes an alkali-resistant fabric and a non-porous membrane. The cementitious board includes (a) a cementitious core; and (b) the reinforcing layer disposed on at least one face of the cementitious core, the reinforcing layer including the alkali-resistant fabric and the non-porous membrane.

19 Claims, 1 Drawing Sheet

(56) References Cited

U.S. PATENT DOCUMENTS

| | | |
|---|---|---|
| 4,106,588 A | 8/1978 | Moore et al. |
| 4,255,485 A | 3/1981 | Yau |
| 4,265,979 A | 5/1981 | Baehr et al. |
| 4,328,652 A | 5/1982 | Naumovich, Jr. |
| 4,378,405 A | 3/1983 | Pilgrim |
| 4,563,392 A | 1/1986 | Harpell et al. |
| 4,811,538 A | 3/1989 | Lehnert et al. |
| 4,948,647 A | 8/1990 | Burkard |
| 5,102,728 A | 4/1992 | Gay et al. |
| 5,112,678 A | 5/1992 | Gay et al. |
| 5,316,848 A | 5/1994 | Bartlett et al. |
| 5,397,631 A | 3/1995 | Green et al. |
| 5,871,857 A | 2/1999 | Alhamad |
| 6,054,088 A | 4/2000 | Alhamad |
| 6,069,098 A | 5/2000 | Shimizu et al. |
| 6,254,817 B1 | 7/2001 | Cooper et al. |
| 6,269,595 B1 | 8/2001 | Blubaugh et al. |
| 6,334,280 B1 | 1/2002 | Frappart et al. |
| 6,524,679 B2 | 2/2003 | Hauber et al. |
| 6,531,210 B1 | 3/2003 | Englert |
| 6,673,177 B2 | 1/2004 | Buckwalter et al. |
| 6,746,781 B2 | 6/2004 | Francis et al. |
| 6,787,486 B1 | 9/2004 | Gregg et al. |
| 6,800,361 B2 | 10/2004 | Bruce et al. |
| 6,866,492 B2 | 3/2005 | Hauber et al. |
| 6,868,643 B1 * | 3/2005 | Williams .................. E04B 1/70 52/302.1 |
| 6,925,766 B2 | 8/2005 | Di Pede |
| 6,941,720 B2 | 9/2005 | DeFord et al. |
| 6,977,111 B2 | 12/2005 | Yamaguchi et al. |
| 6,983,821 B2 | 1/2006 | Putt et al. |
| 7,138,346 B2 | 11/2006 | Bush et al. |
| 7,354,876 B2 | 4/2008 | Porter et al. |
| 7,393,799 B2 | 7/2008 | Porter |
| 7,594,456 B2 | 9/2009 | Hlauber et al. |
| 7,763,134 B1 | 7/2010 | Kumar |
| 7,807,592 B2 | 10/2010 | Bland et al. |
| 7,908,810 B2 | 3/2011 | Payne, Jr. et al. |
| 8,070,895 B2 | 12/2011 | Engbrecht et al. |
| 8,309,211 B2 | 11/2012 | Mehta et al. |
| 8,323,770 B2 | 12/2012 | Mehta et al. |
| 8,353,401 B2 | 1/2013 | Hauber et al. |
| 8,397,864 B2 | 3/2013 | Tinianov et al. |
| 8,486,516 B2 | 7/2013 | Hauber et al. |
| 8,557,366 B2 | 10/2013 | Harrington, Jr. et al. |
| 8,568,544 B2 | 10/2013 | Engbrecht et al. |
| 8,832,923 B2 | 9/2014 | Hauber et al. |
| 9,068,586 B2 | 6/2015 | Hauber et al. |
| 9,186,869 B2 | 11/2015 | Hauber et al. |
| 9,259,888 B2 | 2/2016 | Hauber et al. |
| 9,346,244 B2 | 5/2016 | Hauber et al. |
| 9,388,568 B2 | 7/2016 | Tinianov |
| 9,512,613 B2 | 12/2016 | Blades et al. |
| 9,834,929 B2 | 12/2017 | Boydston et al. |
| 9,885,179 B2 | 2/2018 | Hauber et al. |
| 2002/0102390 A1 | 8/2002 | O'Neill et al. |
| 2002/0151240 A1 | 10/2002 | Smith et al. |
| 2002/0170648 A1 | 11/2002 | Dinkel |
| 2002/0187297 A1 | 12/2002 | Hauber et al. |
| 2003/0114068 A1 | 6/2003 | Phillips et al. |
| 2003/0118377 A1 | 6/2003 | Hirano |
| 2004/0142618 A1 | 7/2004 | Porter |
| 2004/0224584 A1 | 11/2004 | Broadway |
| 2005/0009428 A1 | 1/2005 | Porter et al. |
| 2005/0097857 A1 | 5/2005 | Mehta et al. |
| 2005/0130541 A1 | 6/2005 | Shah |
| 2005/0202742 A1 | 9/2005 | Smith et al. |
| 2005/0255308 A1 | 11/2005 | Gregg et al. |
| 2006/0233656 A1 | 10/2006 | Matsushima |
| 2007/0015424 A1 | 1/2007 | Toas |
| 2007/0077436 A1 | 4/2007 | Naji et al. |
| 2007/0093159 A1 | 4/2007 | Kajander |
| 2007/0110980 A1 | 5/2007 | Shah |
| 2007/0141931 A1 | 6/2007 | Nandi et al. |
| 2007/0197114 A1 | 8/2007 | Grove |
| 2008/0057318 A1 | 3/2008 | Adzima et al. |
| 2009/0007513 A1 | 1/2009 | Moreno et al. |
| 2009/0186549 A1 | 7/2009 | Bennett |
| 2009/0208714 A1 | 8/2009 | Currier et al. |
| 2010/0055431 A1 | 3/2010 | College |
| 2010/0178827 A1 | 7/2010 | Thai et al. |
| 2010/0247937 A1 | 9/2010 | Liu et al. |
| 2010/0316808 A1 | 12/2010 | Hall et al. |
| 2011/0083396 A1 | 4/2011 | Shelton et al. |
| 2011/0165394 A1 | 7/2011 | Hirose et al. |
| 2011/0173910 A1 | 7/2011 | Franklin et al. |
| 2011/0256372 A1 | 10/2011 | Hauber et al. |
| 2011/0257301 A1 | 10/2011 | Stuart et al. |
| 2011/0297375 A1 | 12/2011 | Shindgikar et al. |
| 2012/0308795 A1 | 12/2012 | Hauber et al. |
| 2013/0178126 A1 | 7/2013 | Bennett |
| 2013/0240111 A1 | 9/2013 | Tinianov |
| 2013/0295360 A1 * | 11/2013 | Nagy ..................... B28B 23/02 428/219 |
| 2014/0242862 A1 | 8/2014 | Porter et al. |
| 2014/0272404 A1 * | 9/2014 | Shake ..................... B32B 17/06 428/339 |
| 2014/0377519 A1 * | 12/2014 | Rancich .................. E04B 1/665 156/324 |
| 2015/0064488 A1 | 3/2015 | Foster et al. |
| 2015/0197938 A1 | 7/2015 | Boydston et al. |
| 2016/0069070 A1 | 3/2016 | Li |
| 2016/0347936 A1 | 12/2016 | Garces et al. |
| 2017/0002564 A1 | 1/2017 | Peet et al. |
| 2017/0282510 A1 | 10/2017 | Peet et al. |
| 2017/0284093 A1 | 10/2017 | Lai et al. |
| 2017/0313630 A1 * | 11/2017 | Peet ....................... C09J 131/04 |
| 2018/0187416 A1 | 7/2018 | Hauber et al. |

FOREIGN PATENT DOCUMENTS

| | | |
|---|---|---|
| CN | 103104078 A | 5/2013 |
| CN | 103526902 A | 1/2014 |
| CN | 203381271 U | 1/2014 |
| CN | 203383245 U | 1/2014 |
| CN | 104277283 A | 1/2015 |
| CN | 104947817 A | 9/2015 |
| CN | 103437434 B | 2/2016 |
| CN | 104018598 B | 3/2016 |
| CN | 205369691 U | 7/2016 |
| CN | 205399869 U | 7/2016 |
| CN | 106945371 A | 7/2017 |
| DE | 202013001212 U1 | 2/2013 |
| EP | 0081760 B1 | 8/1985 |
| EP | 0114965 B1 | 1/1990 |
| EP | 0808712 A2 | 11/1997 |
| EP | 3184682 A1 | 6/2017 |
| EP | 3221140 | 9/2017 |
| GB | 2166385 A | 5/1986 |
| JP | S53027739 B | 1/1974 |
| JP | S5429 A | 1/1979 |
| JP | S5433523 A | 3/1979 |
| JP | S5876564 A | 5/1983 |
| JP | S63110347 A | 5/1985 |
| JP | S61252147 A | 11/1986 |
| JP | H02131901 A | 5/1990 |
| JP | H04166544 A | 6/1992 |
| JP | H0598771 A | 4/1993 |
| JP | H06170820 A | 6/1994 |
| JP | H08300550 A | 11/1996 |
| JP | H09242208 A | 9/1997 |
| JP | H1077690 A | 3/1998 |
| JP | H10109385 A | 4/1998 |
| JP | H10252171 A | 9/1998 |
| JP | H11315595 A | 11/1999 |
| JP | 2000248648 A | 9/2000 |
| JP | 3334475 B2 | 10/2002 |
| JP | 2005297254 A | 10/2005 |
| JP | 2006159516 A | 6/2006 |
| JP | 4106817 B2 | 6/2008 |
| JP | 2008207516 A | 9/2008 |
| JP | 2011132753 A | 7/2011 |
| JP | 5199632 B2 | 5/2013 |
| JP | 5301013 B1 | 9/2013 |

(56) References Cited

FOREIGN PATENT DOCUMENTS

| | | |
|---|---|---|
| JP | 2015504377 A | 2/2015 |
| JP | 2016520443 A | 7/2016 |
| KR | 20000072869 A | 12/2000 |
| KR | 20010003957 A | 1/2001 |
| KR | 20020076428 A | 10/2002 |
| KR | 20110003554 U | 4/2011 |
| KR | 101383218 B1 | 4/2014 |
| KR | 20140046806 A | 4/2014 |
| KR | 20140109869 A | 9/2014 |
| KR | 101552593 B1 | 9/2015 |
| WO | 0125562 A1 | 4/2001 |
| WO | 03004786 A2 | 1/2003 |
| WO | 2013155477 A1 | 10/2013 |
| WO | 2014124548 A2 | 8/2014 |
| WO | 2014143780 A1 | 9/2014 |
| WO | 2016081903 A1 | 5/2016 |

OTHER PUBLICATIONS

Archi Expo smoke flue, 5 pages, http://www.archiexpo.com/architecture-design-manufacturer/smoke-flue-4174.html.
Archi Expo waterproofing membrane, 11 pages, http://www.archiexpo.com/architecture-design-manufacture/waterpoofing-membrane-5031.html.
ASTM International, "Standard Specification for Self-Adhering Polymer Modified Biuminous Sheet Materials Used as Steep Roofing Underlayment for Ice Dam Protection", 2015, 6 pages.
ASTM International, "Standard Test Method for Determining the Capability of Roofing and Waterproofing Materials Materials to Seal around Fasteners", 2015, 5 pages.
Drain-N-Dry Lath—A Superior Lath and Best-in Class Rainscreen in . . . , https://drainndrylath.com//, 5 pages, Boral.
Waterproofing and Anti-Fracture Membrane Mesh/TDS-238, 2018, 2 pages, Custom Building Products.
DeMeuse, Mark T. (2011), "Biaxial stretching of film—Principles and Applications—1. Fundamentals of biaxial stretching and definitions of terms", Woodhead Publishing, app.knovel.com/hotlinklpdf/id:kt0094H3A1/biaxial-stretching-film/fundamentals-biaxial, 14 pages.
Gold Bond e2XP Extended Exposure Interior Extreme Gypsum Panel, 2011, 6 pages, National Gypsum Company.
DensElement Barrier System Technical Guide, 2018, 16 pages, Georgia-Pacific Gypsum.
International Search Report for PCT/US2017/025540, dated Aug. 18, 2017, 1 page.
International Search Report for PCT/US2017/025607, dated Aug. 18, 2017, 1 page.
Aquapanel Tyvek Water-Resistive Barrier Moisture permeable water barrier, 2014, 2 pages, Knauf USG Systems GmbH & Co. KG.
Schluter-KERDI, Waterpooofing (KERDI)/Membranes, https://www.schluter.com/schluter-us/en_US/Membranes/Waterproofing-(KERDI)/Schluter%C2%AE-KERDI/p/KERDI.
Selke, Susan E. M., et al., (2016), Plastics Packaging, Properties Processing Applications, and Regulations (3rd Edition) 4.9.1 Polyethylene Terephthalate (PET), Hanswer Publishers, retrieved from app.Knovel/hotlink/toc/id: kpPPPPARE1/plastics-packaging-properties/plastics-packaging-properties, 5 pages.
USG Durock Brand Waterproofing Membrane and Band, 2017, 2 pages, ISG Corporation.
Waterproofing Contractors Handbook, 172 pages, W.R. Meadows, Inc.
3M Air and Vapor Barrier 3015, 6 pages, 3M.

\* cited by examiner

REINFORCING LAYER, A CEMENTITIOUS BOARD, AND METHOD OF FORMING THE CEMENTITIOUS BOARD

CROSS-REFERENCE TO RELATED APPLICATIONS

This application claims priority under 35 U.S.C. § 119(e) to U.S. Provisional Patent Application No. 62/607,794, entitled "A REINFORCING LAYER, A CEMENTITIOUS BOARD, AND METHOD OF FORMING THE CEMENTITIOUS BOARD", by Nancy E. BROWN et al., filed Dec. 19, 2017, which is assigned to the current assignee hereof and incorporated herein by reference in its entirety.

FIELD OF THE DISCLOSURE

This disclosure, in general, relates to a reinforcing layer for cementitious boards.

BACKGROUND

Cementitious boards useful in the construction industry are known to contain inorganic, hydraulically setting material, such as a modified cement or gypsum. Hydraulic gypsum and cement, once set, have very little tensile strength and are usually reinforced with facing materials which improve the resistance to tensile and flexural loads. This has been the basis for using paper facing on conventional gypsum wall board and glass fiber scrim in cement boards.

Glass fiber meshes have been popular as a facing sheet in cement boards because they provide greater mechanical properties. Current glass scrim reinforcements typically include a coating of PVC plastisol. When placed in cement boards, the glass scrim reinforcement is embedded within the cementitious board to provide strength and offset the brittleness of the cement.

As such, an improved reinforcing composite for cementitious boards is desired.

SUMMARY

In a particular embodiment, a reinforcing layer for a cementitious board includes an alkali-resistant fabric and a non-porous membrane.

In another exemplary embodiment, a cementitious board includes (a) a cementitious core; and (b) a reinforcing layer disposed on at least one face of the cementitious core; the reinforcing layer including an alkali-resistant fabric and a non-porous membrane.

In another embodiment, a method of making a cementitious board includes (a) providing a reinforcing layer including an alkali-resistant fabric and a non-porous membrane; (b) depositing a cementitious slurry on the reinforcing layer; and (c) forming the cementitious slurry and the reinforcing layer into the cementitious board.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
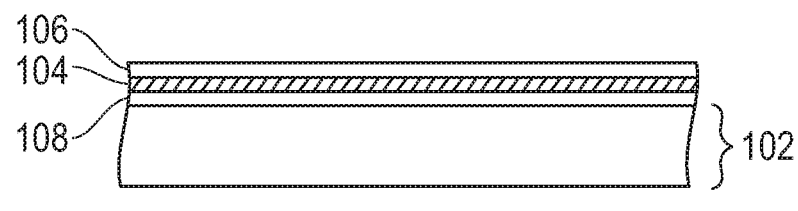
FIG. 1 includes a side cross-sectional view of an exemplary reinforcing composite.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

Before addressing details of the embodiments described below, some terms are defined or clarified. The term "degradation" is intended to mean a process or technique by which one or more properties of a product, such as a polymer- and/or glass-based product, is degraded under the influence of one or more environmental factors, such as exposure to heat, light, or chemicals. The term "ASTM" is intended to refer to the American Society for Testing and Materials (ASTM) Standard. The term "psi" is intended to refer to the measurement unit of pounds per square inch.

As used herein, the terms "comprises", "comprising", "includes", "including", "has", "having", or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive—or and not to an exclusive—or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

A reinforcing layer, a cementitious board and methods of making a cementitious board having the reinforcing layer are provided. The reinforcing layer includes an alkali-resistant fabric and a non-porous membrane. In a particular embodiment, the non-porous membrane has a water vapor permeance of less than about 0.5 perm as measured by ASTM E49 Method E. The alkali-resistant fabric in combination with the non-porous membrane provides a reinforcing layer with desirable physical properties, particularly when used in a cementitious board. In particular, the use of the non-porous membrane with the alkali-resistant fabric provides desirable placement of the reinforcing layer in the cementitious board and improved desirable physical properties to the resulting cementitious board.

The non-porous membrane of the reinforcing layer may be any reasonable material that has a water vapor permeance of less than 0.5 perm as measured by ASTM E49 Method E. In an embodiment, the non-porous membrane provides waterproofing properties. In a particular embodiment, the non-porous membrane includes at least one continuous polymeric film. "Continuous film" as used herein refers to a film that is substantially uniform in thickness and has a width and length that spans across a total width and length of the reinforcing composite. "Substantially uniform" as used herein refers to a thickness that does not vary by more than 2% across the entire width and length of the continuous film. Any thickness of the continuous polymeric film is envisioned. In an embodiment, the thickness of the continuous polymeric film may be dependent upon the polymer chosen. In an example, the thickness of the at least one continuous polymeric film may be, for example, such as greater than 1 mil, such as greater than 3 mils, such as about 3 mils to about 15 mils, such as about 3 mils to about 10 mils, such as about 3 mils to about 5 mils. In an embodiment, the polymer film has a minimum thickness. Any minimum thickness is envisioned. In an embodiment, the minimum thickness is at least about 3 mils thick. In another embodiment, the minimum thickness may be less than 3 mils thick with the proviso that the polymer film meets ANSI 118.10 criteria. In an embodiment, the at least one continuous polymeric film provides water vapor permeance and a membrane breaking strength that meets ANSI 118.10 criteria. The membrane shall not support mold growth when tested according to ANSI 118.10 for fungus and microorganism resistance.

In an embodiment, any polymer is envisioned for the at least one continuous polymeric film with the proviso that the polymer provides a water vapor permeance as described. In an embodiment, the polymer is a thermoplastic or a thermoset material. In a particular embodiment, the polymer includes a polyolefin such as, for example, a high density polyethylene (HDPE), a polypropylene, or combination thereof. In a more particular embodiment, the at least one continuous polymeric film is a high density polyethylene. In a particular embodiment, the non-porous membrane has a breaking strength of greater than 170 psi as measured by ASTM D751.

In an embodiment, the polymer film has a low filler content. "Low filler" as used herein refers to less than about 5 weight %, such as less than about 3 weight %, or even less than about 2 weight % based on the total weight of the polymer film. In a particular embodiment, the polymer film is substantially free of filler. "Substantially free of filler" as used herein refers to less than about 1.0 weight %, or less than about 0.1 weight % of filler, based on the total weight of the polymer film. In a particular embodiment, it has been discovered that a polymer film with low filler or substantially free of filler has improved performance for the reinforcing layer compared to a polymer film with filler content greater than 10 weight % based on the total weight of the polymer film. For instance, the polymer film with low filler or substantially free of filler is stronger compared to a polymer film with filler content greater than 10 weight % based on the total weight of the polymer film for the same film thickness. For instance, the polymer film with low filler or substantially free of filler has a breaking strength that is at least two-fold greater (breaking strength of 980 psi) than a polymer film with filler content greater than 10 weight % based on the total weight of the polymer film (breaking strength of 420 psi), as measured via ASTM D751 procedure B.

In an embodiment, the reinforcing layer further includes at least one layer of an alkali-resistant fabric. Any reasonable alkali-resistant fabric is envisioned. An "alkali-resistant fabric" as used herein includes a material that provides resistance to an alkali environment without substantial degradation of the reinforcing layer. Exemplary alkali-resistant materials for the alkali-resistant fabric include a polyester, a polyvinyl alcohol, a polypropylene, a polyethylene, an alkali-resistant glass, a non-alkali resistant glass, or combination thereof. In an embodiment, the alkali-resistant material includes a non-alkali-resistant glass such as, for example, E-glass that includes an alkali-resistant coating.

The alkali-resistant fabric includes a fiber. The term "fiber" as used herein refers to filamentary materials. Often, "fiber" is used synonymously with "filament". The term "filament" is intended to mean an elongated structure or fiber of any suitable length. It is generally accepted that a filament routinely has a finite length that is at least 100 times its diameter. An assemblage of filaments may also be known as a "yarn". In an embodiment, the fibers are provided at any length envisioned. In a particular embodiment, the fibers are assembled into a yarn which may be generally described as an assemblage of twisted filaments, fibers, or strands, either natural or manufactured, to form a continuous length suitable for use in weaving or interweaving into a fabric. In another embodiment, the fibers, yarn, and the like, are provided in any assemblage and at any length envisioned.

Any assembly of the alkali-resistant material into an alkali-resistant fabric is envisioned. In an embodiment, the alkali-resistant material may be formed into the alkali-resistant fabric in the form of a scrim, a woven fabric, a braided fabric, a knitted fabric, or combination thereof. A "knitted fabric" typically includes fabrics produced by interloping chains of filaments, roving, or yarn. The term "scrim" is intended to generally mean a fabric that includes at least two filaments oriented in two different directions, including but not limited to a mesh. A scrim may also be known as a "laid-scrim" and describes a fabric that is nonwoven with warp yarns and weft yarns. The warp yarns refer to yarns, fibers, or roving running lengthwise in long lengths and approximately parallel. The weft yarns refer to the threads that transverse the warp yarns. In a particular embodiment, the weft yarns run perpendicular to the warp and are also called fill, filling, yarn or woof. The term "laid scrim" is intended to mean a scrim in which at least one filament overlies at least one other filament to create the scrim. In a particular embodiment, the alkali-resistant fabric is in the form of a scrim. A "woven fabric" describes a fabric have warp yarns and weft yarns that are intertwined at an intersection point. The alkali-resistant material may be converted to fabric form by a conventional weaving operation, such as a loom, or a non-weaving operation.

Any other construction can also be envisioned for the alkali-resistant fabric. In an embodiment, constructions include stitchbonding or warp knitting. Any conventional means include plain weaving, twill or satin weaving, unidirectional weaving, knitting or stitchbonding. In an embodiment, fine-fiber strands of yarn from the forming operation can be air dried on forming tubes to provide sufficient integrity to undergo a twisting operation. Twist provides additional integrity to yarn before it is subjected to the weaving process. Any twist is envisioned. A typical twist includes up to about 0.7 turns/inch to about 1.0 turns/inch. In many instances, heavier yarns may be used for the weaving operation. This is normally accomplished by twisting together two or more single strands, followed by a plying operation. Plying typically includes retwisting the twisted strands in the opposite direction from the original twist. Any type of twist is envisioned. The two types of twist normally used are known as S and Z, which indicate the direction in which the twisting is done. Typically, two or more strands twisted together with an S twist are plied with a Z twist in order to give a balanced yarn. Thus, the yarn properties, such as strength, bundle diameter, and yield, can be manipulated by the twisting and plying operations. Zero twist-yarns may also be used. This input can offer the ease of spreading of (twistless) roving with the coverage of fine-filament yarns.

The major characteristics of the knit or woven embodiments of the alkali-resistant fabric include its style or weave pattern, fabric count, and the construction of warp yarn and weft yarn. As used here, "fabric count" identifies the number of warp and weft yarns per inch. In combination, these major characteristics contribute to the fabric properties such as tensile strength, drapability and performance of the final board.

The alkali-resistant fabric has a desirable areal weight. For instance, the areal weight is about 100 grams/m$^2$ to about 500 grams/m$^2$, such as about 125 grams/m$^2$ to about 450 grams/m$^2$. In an embodiment, the alkali-resistant fabric has a thickness of about 5 mils to about 22 mils, such as about 10 mils to about 15 mils prior to coating. The linear density of fibers of the alkali-resistant fabric is typically about 50 tex where yarns are employed, to about 2,500 tex where rovings are employed. In an embodiment, the alkali-resistant fabric may also possess an ASTM D309 tensile strength of at least about 50 pounds per inch (lbs/in), such as at least about 85 pounds per inch to about 95 pounds per inch, such as at least about 100 pounds per inch to about 130 pounds per inch, or even greater in the machine direction and in the cross-machine direction.

The alkali-resistant fabric further includes the binder to adhere the fibers that form the alkali-resistant fabric. Any reasonable binder is envisioned. For instance, the binder can include a polymer. Exemplary polymer binder includes, but is not limited to, an acrylic, a styrene butadiene rubber, a polyvinyl chloride, the like, or combinations thereof to provide desirable adhesion to the cement based mortar. In a particular embodiment, the binder can include a polyvinyl chloride. The binder is present in an amount to bind the alkali-resistant fabric. Any reasonable amount of the polymer is present in the binder, such as at least about 1.0 weight %, such as at least about 5.0 weight %, such as at least about 10.0 weight %, or even greater, based on the total weight of the binder composition. In a particular embodiment, the polymer is a polyvinyl chloride in a solution of plasticizer, such as wherein the polyvinyl chloride is greater than 50% by weight of the total binder solution. In an embodiment, the binder may be coated on individual strands of fiber, filaments, or yarn. In an embodiment, the binder coats the front surface, the back surface, or combination thereof of the alkali-resistant fabric. In an embodiment, the binder coats a combination of both the front surface and the back surface of the alkali-resistant fabric. In a particular embodiment, the alkali-resistant material is coated with the binder without any exposed surface of the alkali-resistant material. In a more particular embodiment, the binder provides a homogenous, continuous coating on the alkali-resistant fabric without any exposed surface of the alkali-resistant material. For instance, the binder is present at an amount of about 30% by weight to about 250% by weight of the total weight % of the alkali-resistant fabric, such as about 40% by weight to about 70% by weight of the total weight of the alkali-resistant fabric. Typically, the binder is coated on the alkali-resistant fabric at any reasonable thickness. In an embodiment, the thickness of the alkali-resistant fabric with the binder coating is about 0.008 inch to about 0.018 inch, such as about 0.010 inch to about 0.012 inch.

Additionally, the binder can be provided with any reasonable additive. Exemplary additives include viscosity modifiers, additives for improved heat resistance, defoaming, re-wetting agents, mold inhibitors, fire retardants, coloring agents, and the like. In an embodiment, the additive may include, for example, a solvent, a plasticizer, or combinations thereof. Any reasonable amount of additive is envisioned. In an embodiment, additives to the binder can promote greater affinity to set gypsum, or to modified cement-based mortars, for example. In an embodiment, the binder is substantially free of additives. "Substantially free" as used herein refers to less than about 0.01 weight % of the total weight % of the binder composition.

The binder can be applied to the alkali-resistant fabric by any reasonable method. The alkali-resistant material may be coated with the binder before forming the alkali-resistant fabric (i.e. by coating the alkali-resistant fiber, filament, or yarn), in-line concurrently with formation of the alkali-resistant fabric, or off-line coating after formation of the alkali-resistant fabric. In an embodiment, the binder can be applied in at least one layer or at least one pass. The number of layers or passes of the binder typically depends on the material chosen for the alkali-resistant fabric as well as its construction. The number of applications of the binder may be dependent upon the desired amount of coating to provide a reinforced fabric. Furthermore, the number of applications of the binder may be dependent on the desired final properties for the final alkali-resistant fabric. Typically, a high porosity may be desired to aid in the embedding of the alkali-resistant fabric in the cementitious board. "Porosity" as used herein may be dependent upon the intersections of the yarns to allow for openings between the spacing of the yarns as well as dependent on the amount of binder applied on the yarns. For instance, less spacing between the yarns provides lower porosity compared to greater spacing between the yarns.

In an embodiment, the alkali-resistant fabric may have an optional coating to impart further properties to the alkali-resistant fabric. In a particular embodiment, the optional coating may provide, for example, reduced porosity, increased adhesion to the cementitious material, resistance to slurry penetration, reduced corrosion, improved strength or fire resistance, reduced water resistance, reduced "fuzziness" of the surface, or any combination thereof. The optional coating is distinguished from the binder used to bond the alkali-resistant material together but may be the same or different composition. Any reasonable composition for the optional coating is envisioned. In an embodiment, the optional coating may be a resinous mixture containing one or more resins. For instance, the resin may be a thermoplastic resin or a thermoset resin. In a particular embodiment, the optional coating may include a UV stabilizer, a mold retardant, an alkali-resistant formulation, a water repellant, a flame retardant, a dispersant, a catalyst, a filler, the like, and combinations thereof.

In an embodiment, the non-porous membrane is adjacent to, and in a particular embodiment, directly in contact with the alkali-resistant fabric. In a particular embodiment, the non-porous membrane may be placed in direct contact with the alkali-resistant fabric in any reasonable manner and typically depends on the materials chosen for the non-porous membrane and the alkali-resistant fabric. In a more particular embodiment, the non-porous membrane is laminated to the alkali-resistant fabric. For instance, the non-porous membrane is laminated to the alkali-resistant fabric using a polymer resin, for instance, polyvinyl chloride, as the binder. In an alternative embodiment, the non-porous membrane is adhered to the alkali-resistant fabric with any reasonable adhesive, such as a heat-activated adhesive.

In an embodiment, the reinforcing layer may further include at least one nonwoven mat. In an embodiment, a "nonwoven mat" may have filaments, fibers, or swirled continuous filament that are randomly-oriented or oriented in a specified configuration. In an embodiment, the fiber for the nonwoven mat is alkali-resistant. Any alkali-resistant fiber is envisioned. In a particular embodiment, the fiber for the nonwoven mat includes a polymeric fiber, a glass fiber, or combination thereof. In an example, the fiber for the nonwoven mat is a polymeric fiber such as a polyolefin. In an embodiment, the polymeric fiber is polypropylene. In a particular embodiment, the nonwoven mat is adjacent to the non-porous membrane. In a more particular embodiment, the nonwoven mat is directly in contact with at least one surface of the non-porous membrane. When present, the nonwoven mat may be in any configuration relative to the non-porous membrane depending on the final properties desired for the reinforcing layer and cementitious board. In an embodiment, a nonwoven mat facing an inside of a cementitious board may be used to provide anchoring of the reinforcing layer in a cementitious slurry due to the porosity of the nonwoven mat. In an embodiment, the nonwoven mat may be present with the reinforcing layer and facing an outer face of a cementitious board. In an exemplary instance, the non-woven mat provides anchoring of a tile with a mortar. For instance, the non-woven mat may provide the failing interface during a shear test (shearing the tile from the cement board).

In a particular embodiment, the non-porous membrane includes the at least one continuous polymer film directly in contact with the at least one non-woven mat. In an embodiment, the continuous polymer film is configured between two non-woven mats. Any number of films and non-woven mats are envisioned for the reinforcing layer. When multiple films are used, they may be the same or different materials, depending on the final properties desired for the reinforcing layer. When multiple non-woven mats are used, they may be the same or different materials, depending on the final properties desired for the reinforcing layer. In an embodiment, the reinforcing layer has any total thickness envisioned, such as, for example, 8 mils to about 35 mils, such as about 10 to about 35 mils.

In an embodiment, the reinforcing layer includes the nonwoven mat positioned between the non-porous membrane and the alkali-resistant fabric. Although not to be bound by theory, the nonwoven mat between the non-porous membrane and the alkali-resistant fabric may have desirable porosity to allow cementitious slurry penetration and subsequently, improved placement of the reinforcing layer within a cementitious board. In an embodiment, the nonwoven mat is placed on the alkali-resistant fabric and the non-porous membrane is subsequently placed on the non-woven mat. In another embodiment, the nonwoven mat is placed on the non-porous membrane and the alkali-resistant fabric is subsequently placed on the nonwoven mat. Any reasonable conditions such as heat, pressure, and the like may be used to position the nonwoven mat between the alkali-resistant fabric and the non-porous membrane. Although described as between the alkali-resistant fabric and the non-porous membrane, any reasonable configuration of the nonwoven mat adjacent to the alkali-resistant fabric and the non-porous membrane is envisioned.

The reinforcing layer is a facing material which may be embedded partially within a cementitious layer on at least one face of a cementitious board. In a particular embodiment, the reinforcing layer with the non-porous membrane provides desirable placement of the reinforcing layer on the at least one face of the cementitious board. For instance, the placement can be set at a precise and targeted depth, such as within about 0.006 inches to about 0.1 inches, such as 0.006 inches to 0.03 inches, such as 0.006 inches to 0.02 inches, or even 0.008 inches to 0.01 inches from an outer surface of the cementitious board. In a particular embodiment, the reinforcing layer has a consistent and uniform depth of embedment within the cementitious board. In particular, the non-porous membrane provides an outer surface of the cementitious board. Although not to be bound by theory, the non-porous membrane is not porous and does not allow cementitious slurry penetration to an outer surface of the non-porous membrane and subsequently, provides improved placement of the reinforcing layer within a cementitious board. In particular, the reinforcing layer including the non-porous membrane helps with the precise and consistent placement of the reinforcing layer at the surface of the cement board, maximizing its distance to the neutral axis in bending mode. It ensures a maximal efficiency of the reinforcing layer during board handling and improves consistency in the cement board mechanical performance. In another embodiment, a cementitious layer may be provided on the non-porous membrane where the cementitious layer provides an outer surface of the cementitious board.

Any cementitious material is envisioned for the cementitious board. The cementitious board typically includes a cementitious matrix material, such as cement paste, mortar or concrete. In an embodiment, the cementitious material may include other types of materials such as gypsum, and geopolymers (inorganic resins). In an embodiment, the cementitious material includes gypsum. If gypsum is used, the material may be formed by mixing water with powdered anhydrous calcium sulfate or calcium sulfate hemihydrate ($CaSO_4 \cdot 1/2H_2O$), also known as calcined gypsum, to form a slurry and thereafter allowing the slurry to set into calcium sulfate dihydrate ($CaSO_4 2H_2O$), a relatively hard material. The cementitious material of the cementitious board will in general include at least about 85 weight % set cement, based on the total weight % of the cementitious material. In an embodiment, the cementitious material is substantially free of gypsum. "Substantially free of gypsum" as used herein refers to less than 1% by weight of gypsum.

In an embodiment, the cementitious material further includes at least one additive that improves the performance of the resulting cementitious board. Additives include chopped fibers dispersed throughout the cement. In an embodiment, the chopped fibers are AR-glass fibers but may also include, for example, other types of glass fibers, aramids, polyolefins, carbon, graphite, polyester, PVA, polypropylene, natural fibers, cellulosic fibers, rayon, straw, paper and hybrids thereof. The cementitious material may include other ingredients or additives such as, for example, fly ash, latex, slag and metakaolin, resins, such as acrylics, polyvinyl acetate, or the like, ceramics, including silicon oxide, titanium oxide, and silicon nitrite, setting accelerators, water and/or fire resistant additives, such as silioxane, borax, fillers, setting retardants, dispersing agents, dyes and colorants, light stabilizers and heat stabilizers, shrinkage reducing admixtures, air entraining agents, setting accelerators, defoaming agents, or combinations thereof. In an embodiment, the cementitious material may contain curing agents. In an embodiment, materials that improve the water-resistant properties of the cementitious product are also included.

As seen in FIG. 1, an exemplary reinforcing layer 100 is provided. The reinforcing composite includes an alkali-resistant fabric 102 and a non-porous membrane 104. The non-porous membrane 104 includes a continuous polymeric film. In an exemplary embodiment, the non-porous membrane 104 is directly adjacent to a first layer of a nonwoven mat 106 and a second layer of a nonwoven mat 108. Although two layers of the nonwoven mats 106 and 108 are illustrated, the reinforcing layer 100 may include just one layer of a nonwoven mat or more than two layers of nonwoven mat. As illustrated, the non-porous membrane 104 and the alkali-resistant fabric 102 are adjacent with the nonwoven mat 108 being directly in contact with the alkali resistant fabric 102 and non-porous membrane 104. In an alternative embodiment, a nonwoven mat is not included in the reinforcing layer 100. Further, other layers may be envisioned for the reinforcing layer 100 such as paper, glue, a release liner, and the like. In an alternative embodiment, the reinforcing layer 100 is free of any other layers, such as paper.

Figure 2:
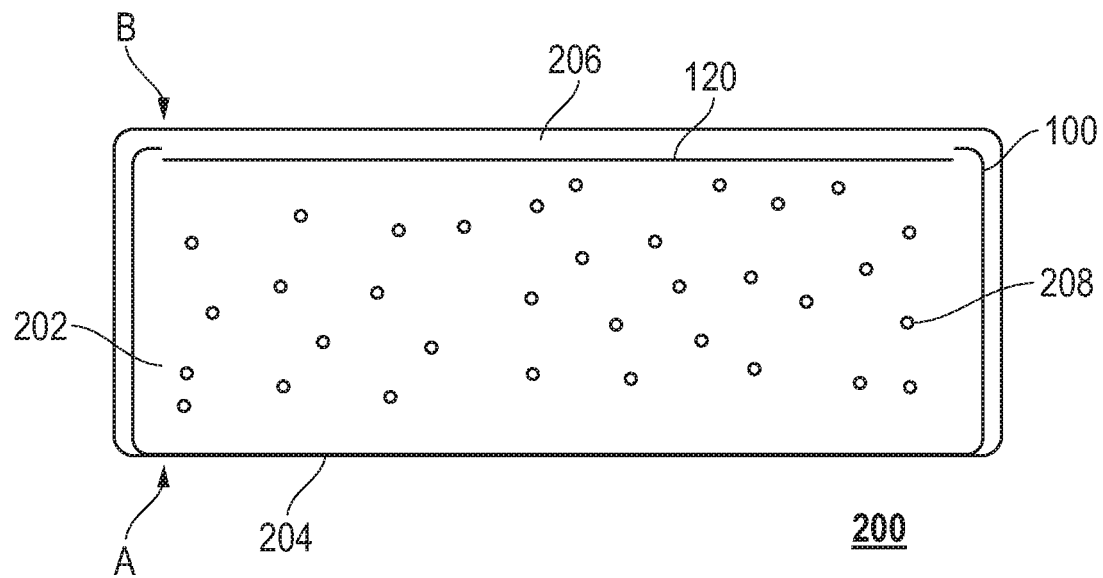
FIG. 2 includes a side cross-sectional view of an exemplary cementitious board showing an embedded reinforcing composite.

In FIG. 2, a cementitious board 200 is provided, including a cementitious core 202, a reinforcing layer 100, and a separate reinforcing layer 120. An exterior surface 204 of the cementitious core 202 is faced with one or more of the reinforcing layer 100 and separate reinforcing layer 120. Any number of layers of reinforcing layer 100 and separate reinforcing layer 120 is envisioned. Although not illustrated, a single reinforcing layer 100 may be used that reinforces an entire perimeter of the cementitious board 200.

The reinforcing layer 100 and separate reinforcing layer 120 may be the same or a different material. In an embodiment, the reinforcing layer 100 provides the exterior surface 204 of the cementitious board 200, as illustrated on side A. In particular, the reinforcing layer 100 has a depth of embedment that is precisely and consistently placed at the exterior surface 204 of the cementitious board 200. For instance, the non-porous membrane 104 of reinforcing layer 100 does not allow cementitious slurry penetration to an outer surface of the non-porous membrane. In an embodiment, a thin cementitious layer 206 is on the exterior surface 204 of the cementitious board 200, as illustrated on side B, for instance, when the thin cementitious layer 206 is placed on reinforcing layer 120. In a particular embodiment, the non-porous membrane 104 of the reinforcing layer 100 is facing the exterior surface 204 of the cementitious board with the alkali-resistant fabric 102 closer to the cementitious core 202. The cementitious core 202 can further include performance additives 208 which can be added to the slurry precursor of the cementitious core 202.

Any method of manufacturing the cementitious board 200 is envisioned, including molding, extrusion, and semi-continuous processes. Typically, the cementitious board 200 can be made by forming an aqueous cementitious slurry which contains excess water and placing the cementitious slurry on the facing material, such as reinforcing layer 100. The reinforcing layer 100 may be folded around the perimeter of the cementitious board 200 before final setting of the cementitious core 202. Folding can be accomplished by any reasonable method such as a combination of guide flanges and rollers which embed the reinforcing layer 100 within the board 200. In a particular embodiment, the reinforcing layer 100 may be precisely placed within a desired depth in the cementitious board 200. Furthermore, separate reinforcing layer 120 may be disposed within the aqueous cementitious slurry before final setting of the cementitious core 202.

The reinforcing layer provides a board product with advantageous properties such as desirable waterproofness, dimensional stability, alkali resistance, and modulus of rupture. In an embodiment, the reinforcing layer provides a desirable dimensional stability. In an embodiment, the non-porous membrane has a dimensional stability is less than 0.7% as measured by ASTM D1204. In an embodiment, the modulus of rupture and break deflection is increased for a cementitious board with a reinforcing layer compared to a reinforcing scrim that does not contain a non-porous membrane. In an embodiment, an initial and aged modulus of rupture (MOR) is greater than 750 psi as measured by ASTM C947 for a cementitious board with the reinforcing layer. Although not to be bound by theory, the advantageous placement of the reinforcing layer with the non-porous membrane within a cementitious board provides beneficial bending performance of the resulting cementitious board. Further, the reinforcing composite has a Gurley Stiffness measurement such that the reinforcing layer is sufficiently flexible such that it is drapable and lacking in shape memory so as to be curved around the edge of a product to be reinforced, such as a cement board, during manufacture of the same. In an embodiment, the reinforcing layer provides a cementitious board that also has desirable abrasion resistance and UV resistance. In a particular embodiment, the reinforcing layer should also be markable to add, for example, regulatory information, manufacturer information, and the like. This can be either done when the reinforcing layer is produced or when the cement boards are made.

Applications for the reinforcing layer are numerous. The reinforcing layer can be employed in many end-use reinforcement applications, such as, for example, cement boards, gypsum boards, roofing applications, polymer-matrix reinforcement, and as stand-alone coated fabrics. In a particular embodiment, the reinforcing layer and cementitious board of this invention are useful in all sorts of building construction applications. The reinforcing layer may be used in any cement board end-product envisioned. In an embodiment, the reinforcing layer may be employed as a tape. In a particular embodiment, the tape is a self-adhesive tape. In an embodiment, the tape may be used to cover seams between two adjacent surfaces, cover or repair a damaged surface, cover fastener heads and other penetrating installations on the board. Any configuration of the reinforcing layer is envisioned. For instance, the reinforcing layer may be continuous or die cut.

In a particular embodiment, the reinforcing layer may be present where moisture and water are problematic, i.e. moisture-rich environments. Due to the water vapor permeance and waterproofness of the non-porous membrane, the reinforcing layer is particularly desirable for moisture-rich environments, such as, for example, a bathroom, kitchen, etc. In particular, the reinforcing layer and cementitious board of the invention can be used with ceramic tile and mortar, stone or brick veneer, and the like. In an embodiment, the non-porous membrane has a waterproofness that holds for 48 hours with a 2 inch water column as measured by ASTM D4068. Furthermore, the reinforcing layer and resulting cementitious board has a shear strength to ceramic tile and mortar of greater than 50 psi before and after water immersion as measured by ASTM C482. Additionally, the reinforcing layer provides a cementitious board that is resistant to fungus and microorganisms with no mold growth as tested by ANSI 118.10. In an embodiment, the laminate adhesion and Z-pull adhesion between the non-porous membrane and alkali-resistant fabric is advantageous. Further, since the reinforcing layer provides desirable water vapor permeance and waterproofness, installation of a cementitious board with the reinforcing layer is faster than installation of a conventional cementitious board with the subsequent installation of a separate waterproofing product. For example, the installer does not need a separate and extra step of waterproofing any surface adjacent the cementitious board with the reinforcing layer.

The reinforcing layer and cementitious board of this invention are strong, having a screw strength of at least about 20 lbs., for cementitious cores of conventional densities and compositions. Some examples include shaft wall assemblies for elevators and stairways, fire doors and fire walls, roofing and siding substrates, with or without insulation, exterior stucco systems, and tile backer boards. Some of the most desirable and useful applications for this invention tile backer boards.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A reinforcing layer for a cementitious board includes an alkali-resistant fabric and a non-porous membrane.

Embodiment 2. A cementitious board includes: (a) a cementitious core; and (b) a reinforcing layer disposed on at least one face of the cementitious core; the reinforcing layer including an alkali-resistant fabric and a non-porous membrane.

Embodiment 3. A method of making a cementitious board includes: (a) providing a reinforcing layer including an alkali-resistant fabric and a non-porous membrane; (b) depositing a cementitious slurry on the reinforcing layer; and (c) forming the cementitious slurry and the reinforcing layer into the cementitious board.

Embodiment 4. The reinforcing layer, the cementitious board, or the method of making the cementitious board of any one of the preceding embodiments, wherein the non-porous membrane includes at least one continuous polymeric film.

Embodiment 5. The reinforcing layer, the cementitious board, or the method of making the cementitious board of embodiment 4, wherein the at least one continuous polymeric film includes a polyolefin.

Embodiment 6. The reinforcing layer, the cementitious board, or the method of making the cementitious board of embodiment 1, wherein the non-porous membrane has a water vapor permeance of less than about 0.5 perm as measured by ASTM E49 Method E.

Embodiment 7. The reinforcing layer, the cementitious board, or the method of making the cementitious board of embodiment 1, wherein the reinforcing layer further includes at least one nonwoven mat.

Embodiment 8. The reinforcing layer, the cementitious board, or the method of making the cementitious board of embodiment 7, wherein the nonwoven mat includes a polymeric fiber.

Embodiment 9. The reinforcing layer, the cementitious board, or the method of making the cementitious board of embodiment 8, wherein the polymeric fiber includes a polyolefin.

Embodiment 10. The reinforcing layer, the cementitious board, or the method of making the cementitious board of embodiment 7, wherein the at least one continuous polymer film is directly in contact with the at least one nonwoven mat.

Embodiment 11. The reinforcing layer, the cementitious board, or the method of making the cementitious board of any one of preceding embodiments, wherein the non-porous membrane has a thickness of about 3 mils to about 5 mils.

Embodiment 12. The reinforcing layer, the cementitious board, or the method of making the cementitious board of any one of the preceding embodiments, wherein the alkali-resistant fabric is adjacent to the non-porous membrane.

Embodiment 13. The reinforcing layer, the cementitious board, or the method of making the cementitious board of any one of the preceding embodiments, further including a nonwoven mat directly in contact with the alkali-resistant fabric.

Embodiment 14. The reinforcing layer, the cementitious board, or the method of making the cementitious board of any one of the preceding embodiments, wherein the alkali-resistant fabric includes a polyester, a polyvinyl alcohol, a polypropylene, an alkali-resistant glass, or combination thereof.

Embodiment 15. The reinforcing layer, the cementitious board, or the method of making the cementitious board of any one of the preceding embodiments, wherein the alkali-resistant fabric includes a scrim, a woven fabric, a braided fabric, a knitted fabric, or combination thereof.

Embodiment 16. The reinforcing layer, the cementitious board, or the method of making the cementitious board of embodiment 15, wherein the alkali-resistant fabric includes a scrim.

Embodiment 17. The reinforcing layer, the cementitious board, or the method of making the cementitious board of any one of the preceding embodiments, wherein the alkali-resistant fabric further includes a binder.

Embodiment 18. The reinforcing layer, the cementitious board, or the method of making the cementitious board of embodiment 17, wherein the binder includes polyvinyl chloride.

Embodiment 19. The reinforcing layer, the cementitious board, or the method of making the cementitious board of any of the preceding embodiments, wherein the alkali-resistant fabric has an areal weight of about 100 grams/m$^2$ to about 500 grams/m$^2$.

Embodiment 20. The reinforcing layer, the cementitious board, or the method of making the cementitious board of any one of the preceding embodiments, wherein the non-porous membrane has a breaking strength of greater than 170 psi as measured by ASTM D751.

Embodiment 21. The reinforcing layer, the cementitious board, or the method of making the cementitious board of any one of the preceding embodiments, wherein the non-porous membrane has a waterproofness that holds for 48 hours with a 2 inch water column as measured by ASTM D4068.

Embodiment 22. The reinforcing layer, the cementitious board, or the method of making the cementitious board of any one of the preceding embodiments, wherein the cementitious board has a shear strength to ceramic tile and mortar of greater than 50 psi before and after water immersion as measured by ASTM C482.

Embodiment 23. The reinforcing layer, the cementitious board, or the method of making the cementitious board of any one of the preceding embodiments, wherein the non-porous membrane has a dimensional stability of less than 0.7% as measured by ASTM D1204.

Embodiment 24. The reinforcing layer, the cementitious board, or the method of making the cementitious board of any one of the preceding embodiments, wherein the cementitious board has an initial and aged modulus of rupture (MOR) of greater than 750 psi as measured by ASTM C947.

Embodiment 25. The reinforcing layer of embodiments 1 and 4-24, wherein the reinforcing layer is disposed on at least one face of a cementitious core.

Embodiment 26. The reinforcing layer, the cementitious board, or the method of making the cementitious board of any one of the preceding embodiments, wherein the reinforcing layer provides an exterior surface of the cementitious board.

Embodiment 27. The reinforcing layer, the cementitious board, or the method of making the cementitious board of embodiment 26, wherein the reinforcing layer is within about 0.006 inches to about 0.1 inches, such as 0.006 inches to 0.03 inches, such as 0.006 inches to 0.02 inches, or even 0.008 inches to 0.01 inches from the exterior surface of the cementitious board.

Embodiment 28. The cementitious board or the method of making the cementitious board of any one of embodiments 2-27, wherein the cementitious core includes a cement matrix.

Embodiment 29. The method of making the cementitious board of any one of embodiments 3-28, further including heating the cementitious slurry to provide a set cement.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A reinforcing layer for a cementitious board comprising an alkali-resistant fabric, a non-porous membrane, and a first non-woven mat, wherein the alkali-resistant fabric comprises a glass fabric laid scrim, wherein the first non-woven mat is directly in contact with the non-porous membrane and the alkali-resistant fabric and wherein the non-porous membrane comprises a polymeric film having a filler content of less than 5 weight % based on the total weight of the polymeric film, the non-porous membrane having a thickness of less than 5 mils, wherein the non-porous membrane has a breaking strength of greater than 170 psi as measured by ASTM D751.

2. The reinforcing layer of claim 1, wherein the polymeric film comprises at least one continuous polymeric film.

3. The reinforcing layer of claim 2, wherein the at least one continuous polymeric film comprises a polyolefin.

4. The reinforcing layer of claim 1, wherein the non-porous membrane has a water vapor permeance of less than about 0.5 perm as measured by ASTM E49 Method E.

5. The reinforcing layer of claim 1, wherein the reinforcing layer further comprises a second nonwoven mat.

6. The reinforcing layer of claim 1, wherein the first nonwoven mat, the second nonwoven mat, or combination thereof comprises a polymeric fiber.

7. The reinforcing layer of claim 5, wherein the non-porous membrane is directly in contact with the second nonwoven mat.

8. The reinforcing layer of claim 1, wherein the non-porous membrane has a thickness of at least about 3 mils.

9. The reinforcing layer of claim 1, wherein the alkali-resistant fabric is directly in contact with the non-porous membrane.

10. The reinforcing layer of claim 1, wherein the alkali-resistant fabric further comprises a polyester, a polyvinyl alcohol, a polypropylene, or combination thereof.

11. The reinforcing layer of claim 1, wherein the alkali-resistant fabric further comprises a woven fabric, a braided fabric, a knitted fabric, or combination thereof.

12. The reinforcing layer of claim 1, wherein the alkali-resistant fabric further comprises a binder.

13. The reinforcing layer of claim 1, wherein the non-porous membrane has a waterproofness that holds for 48 hours with a 2 inch water column as measured by ASTM D4068.

14. The reinforcing layer of claim 1, wherein the reinforcing layer is disposed on at least one face of the cementitious board.

15. The reinforcing layer of claim 14, wherein the reinforcing layer provides an exterior surface of the cementitious board.

16. A cementitious board comprising:
(a) a cementitious core; and
(b) a reinforcing layer disposed on at least one face of the cementitious core; the reinforcing layer comprising an alkali-resistant fabric, a non-porous membrane, and a first non-woven mat, wherein the alkali-resistant fabric comprises a glass fabric laid scrim, wherein the first non-woven mat is directly in contact with the non-porous membrane and the alkali-resistant fabric and wherein the non-porous membrane comprises a polymeric film having a filler content of less than 5 weight % based on the total weight of the polymeric film, the non-porous membrane having a thickness of less than 5 mils, wherein the non-porous membrane has a breaking strength of greater than 170 psi as measured by ASTM D751.

17. The reinforcing layer of claim 16, wherein the reinforcing layer further comprises a second nonwoven mat.

18. The reinforcing layer of claim 17, wherein the nonporous membrane is directly in contact with the second nonwoven mat.

19. The reinforcing layer of claim 16, wherein the first nonwoven mat, the second nonwoven mat, or combination thereof comprises a polymeric fiber.

* * * * *